(12) United States Patent
Beck et al.

(10) Patent No.: US 10,315,503 B2
(45) Date of Patent: Jun. 11, 2019

(54) TRANSMISSION FOR A MOTOR VEHICLE AND HYBRID DRIVE TRAIN PROVIDED THEREWITH

(71) Applicant: ZF Friedrichshafen AG, Friedrichshafen (DE)

(72) Inventors: Stefan Beck, Eriskirch (DE); Martin Brehmer, Tettnang (DE); Matthias Horn, Tettnang (DE); Johannes Kaltenbach, Friedrichshafen (DE); Julian King, Rangweil (AT); Bernd Knöpke, Salem (DE); Jens Moraw, Friedrichshafen (DE); Eckehard Münch, Bünde (DE); Gerhard Niederbrucker, Friedrichshafen (DE); Juri Pawlakowitsch, Kressbronn (DE); Stephan Scharr, Friedrichshafen (DE); Viktor Warth, Friedrichshafen (DE); Michael Wechs, Weißensberg (DE); Peter Ziemer, Tettnang (DE); Uwe Griesmeier, Markdorf (DE); Raffael Kuberczyk, Ravensburg (DE)

(73) Assignee: ZP FRIEDRICHSHAFEN AG, Friedrichshafen (DE)

( * ) Notice: Subject to any disclaimer, the term of this patent is extended or adjusted under 35 U.S.C. 154(b) by 22 days.

(21) Appl. No.: 15/574,378

(22) PCT Filed: Apr. 19, 2016

(86) PCT No.: PCT/EP2016/058593
§ 371 (c)(1),
(2) Date: Nov. 15, 2017

(87) PCT Pub. No.: WO2016/184629
PCT Pub. Date: Nov. 24, 2016

(65) Prior Publication Data
US 2018/0134141 A1    May 17, 2018

(30) Foreign Application Priority Data

May 19, 2015  (DE) .................. 10 2015 209 141

(51) Int. Cl.
*F16H 3/66*    (2006.01)
*B60K 6/365*    (2007.10)
(Continued)

(52) U.S. Cl.
CPC ............... *B60K 6/365* (2013.01); *B60K 6/48* (2013.01); *B60K 6/547* (2013.01); *F16H 3/66* (2013.01);
(Continued)

(58) Field of Classification Search
CPC . F16H 3/724; F16H 3/666; F16H 3/66; B60K 6/48; B60K 6/547
See application file for complete search history.

(56) References Cited

U.S. PATENT DOCUMENTS

| 7,175,562 | B2* | 2/2007 | Gumpoltsberger | F16H 3/666 475/276 |
| 7,294,079 | B2* | 11/2007 | Raghavan | B60L 50/16 475/5 |
| 7,591,750 | B2* | 9/2009 | Bucknor | F16H 3/728 475/284 |
| 7,833,119 | B2* | 11/2010 | Klemen | B60K 6/365 475/282 |
| 8,357,068 | B2* | 1/2013 | Aota | F16H 3/66 475/276 |

(Continued)

FOREIGN PATENT DOCUMENTS

| DE | 10213820 A1 | 10/2002 |
| DE | 102012219733 A1 | 4/2014 |

(Continued)

OTHER PUBLICATIONS

International Search Report (English Translation) PCT/EP2016/058593, dated Jun. 16, 2016. (2 pages).

*Primary Examiner* — Patrick H Mackey

(74) *Attorney, Agent, or Firm* — Dority & Manning, P.A.

(57) ABSTRACT

A transmission (G) for a motor vehicle includes three planetary gear sets (P1, P2, P3), an electric motor (EM) and five shift elements (B1, K1, K2, K3, K4). Selective engagement of the five shift elements (B1, K1, K2, K3, K4) realizes at least eight selectable forward gear ratios (G1-G8) between an input shaft (GW1) and an output shaft (GW2) of the transmission (G).

17 Claims, 4 Drawing Sheets

(51) Int. Cl.
*B60K 6/48* (2007.10)
*B60K 6/547* (2007.10)
*F16H 3/72* (2006.01)

(52) U.S. Cl.
CPC ............ *F16H 3/666* (2013.01); *F16H 3/724* (2013.01); *B60K 2006/4816* (2013.01); *B60Y 2200/92* (2013.01); *F16H 2200/006* (2013.01); *F16H 2200/0086* (2013.01); *F16H 2200/201* (2013.01); *F16H 2200/2043* (2013.01); *F16H 2200/2048* (2013.01); *F16H 2200/2064* (2013.01); *F16H 2200/2094* (2013.01); *F16H 2200/2097* (2013.01); *Y02T 10/6221* (2013.01); *Y02T 10/6256* (2013.01); *Y10S 903/911* (2013.01); *Y10S 903/919* (2013.01)

(56) References Cited

U.S. PATENT DOCUMENTS

| | | | |
|---|---|---|---|
| 8,444,517 B2* | 5/2013 | Gradu | B60K 6/365 |
| | | | 475/5 |
| 8,475,322 B2* | 7/2013 | Aota | F16H 3/666 |
| | | | 475/275 |
| 8,894,525 B2* | 11/2014 | Sugino | B60K 6/365 |
| | | | 475/5 |
| 10,189,346 B2* | 1/2019 | Beck | B60K 6/365 |
| 2002/0142880 A1 | 10/2002 | Hayabuchi et al. | |
| 2007/0129203 A1* | 6/2007 | Raghavan | F16H 3/728 |
| | | | 475/275 |
| 2007/0219036 A1 | 9/2007 | Bucknor et al. | |
| 2007/0225097 A1* | 9/2007 | Raghavan | B60K 6/365 |
| | | | 475/5 |
| 2010/0041503 A1* | 2/2010 | Borntraeger | B60K 6/365 |
| | | | 475/5 |
| 2011/0028261 A1* | 2/2011 | Yamamoto | F16H 3/66 |
| | | | 475/269 |

FOREIGN PATENT DOCUMENTS

| | | |
|---|---|---|
| DE | 102012025369 A1 | 7/2014 |
| WO | WO 2014/102030 A1 | 7/2014 |

* cited by examiner

|    | B1 | K1 | K2 | K3 | K4 |
|----|----|----|----|----|----|
| G1 | X  | X  |    |    |    |
| G2 | X  |    |    | X  |    |
| G3 | X  |    | X  |    |    |
| G4 |    |    | X  | X  |    |
| G5 |    | X  | X  |    |    |
| G6 |    |    | X  |    | X  |
| G7 |    | X  |    |    | X  |
| G8 |    |    |    | X  | X  |

|    | B1 | B2 | K1 | K2 | K5 | K3 | K4 |
|----|----|----|----|----|----|----|----|
| R2 | X  | X  |    |    |    | X  |    |
| R1 | X  | X  | X  |    |    |    |    |
| 1  | X  |    | X  |    | X  |    |    |
| 2  | X  |    |    |    | X  | X  |    |
| 3  | X  |    |    | X  | X  |    |    |
| 4  |    |    |    | X  | X  | X  |    |
| 5  |    |    | X  | X  | X  |    |    |
| 6  |    |    |    | X  | X  |    | X  |
| 7  |    |    | X  |    | X  |    | X  |
| 8  |    |    |    |    | X  | X  | X  |

TRANSMISSION FOR A MOTOR VEHICLE AND HYBRID DRIVE TRAIN PROVIDED THEREWITH

FIELD OF THE INVENTION

The invention relates generally to a transmission for a motor vehicle, having an input shaft, an output shaft, three planetary gear sets and at least five shift elements. The invention also relates to a hybrid drivetrain for a motor vehicle.

BACKGROUND

An automatic transmission for a vehicle is known from FIG. 7 of the publication DE 102 13 820 A1. However, said automatic transmission does not have an electric machine or motor.

In the prior art, it is known for an existing automatic transmission to be supplemented by an electric machine in order to permit a purely electric or a hybrid driving operation of a motor vehicle with the automatic transmission. Normally, a rotor of the electric machine is rotationally fixedly connected to the input shaft for this purpose. The rotor may however also be connected to a shaft of the automatic transmission which is neither the input nor the output shaft. By way of example, reference is made in this regard to the applicant's publication DE 10 2007 005 438 A1. However, according to said publication, the electric machine cannot output or receive power in all gear ratios of said automatic transmission because said electric machine is arranged on the same shaft as a brake of the automatic transmission.

It is also known for the electric machine to be connected to an existing automatic transmission by a fixed upstream transmission ratio with respect to the input shaft. By way of example, reference is made in this regard to the applicant's publication DE 10 2008 040 498 A1. There, a hybrid module with a transmission ratio stage is provided which is connected upstream of the automatic transmission itself. Via the fixed upstream transmission ratio, the electric machine can be configured for higher rotational speeds and lower torque, and thus the electric machine has a small structural space requirement. However, the automatic transmission according to the prior art requires an additional planetary gear set for this purpose, whereby the effort for constructing the automatic transmission is increased.

SUMMARY OF THE INVENTION

Here, a transmission refers in particular to a multi-ratio transmission in which a multiplicity of gears, that is to say transmission ratios, between the input shaft and the output shaft can be selected, preferably in automatic fashion, by shift elements. The shift elements are in this case for example clutches or brakes. Such transmissions are used in particular in motor vehicles for the purposes of suitably adapting the rotational speed and torque output characteristic of the drive unit to the driving resistances of the vehicle.

Examples aspects of the invention provide a transmission for a motor vehicle. The transmission has an integral electric machine or motor with upstream transmission ratio for providing hybrid-typical functionalities in all gear ratios without unduly increasing the effort in terms of construction thereof. Furthermore, the transmission should have a simple and compact design and a high level of mechanical efficiency.

The transmission has three planetary gear sets and at least five shift elements, the selective engagement of which realizes at least eight selectable forward gear ratios between an input shaft and an output shaft of the transmission.

A planetary gear set includes a sun gear, a carrier and a ring gear. Rotatably mounted on the carrier are planet gears which mesh with the toothing of the sun gear and/or with the toothing of the ring gear. A minus or negative gear set refers to a planetary gear set with a carrier on which the planet gears are rotatably mounted, having a sun gear and having a ring gear, wherein the toothing of at least one of the planet gears meshes both with the toothing of the sun gear and with the toothing of the ring gear, whereby the ring gear and the sun gear rotate in opposite directions of rotation when the sun gear rotates in the presence of a static carrier. A plus or positive gear set differs from the minus planetary gear set described directly above in that the plus gear set has inner and outer planet gears which are mounted rotatably on the carrier. The toothing of the inner planet gears meshes in this case at one side with the toothing of the sun gear and at the other side with the toothing of the outer planet gears. The toothing of the outer planet gears furthermore meshes with the toothing of the ring gear. This has the result that, in the presence of a static carrier, the ring gear and the sun gear rotate in the same direction of rotation.

The first, second and third planetary gear sets have in each case a first, second and third element. The first element is formed by a sun gear of the respective planetary gear set. If the planetary gear set is embodied as a minus gear set, the second element is formed by a carrier of the planetary gear set, and the third element is formed by a ring gear of the planetary gear set. If the planetary gear set is formed as a plus gear set, the second element is formed by the ring gear of the planetary gear set, and the third element is formed by the carrier of the planetary gear set.

The first element of the first planetary gear set is permanently rotationally fixedly immobilized. The second element of the first planetary gear set is permanently connected to the input shaft. The first element of the second planetary gear set is permanently connected to the first element of the third planetary gear set. The second element of the second planetary gear set is connected to the third element of the third planetary gear set in all the forward gear ratios. The third element of the third planetary gear set is permanently connected to the output shaft.

The third element of the second planetary gear set is rotationally fixedly immobilizable by closing the first shift element, in that the third element of the second planetary gear set is rotationally fixedly connected to a housing of the transmission or to some other rotationally fixed component of the transmission. A rotationally fixed connection between the input shaft and the first element of the second planetary gear set is produced by closing the second shift element. A rotationally fixed connection between the input shaft and the second element of the third planetary gear set is produced by closing the third shift element. A rotationally fixed connection between the third element of the first planetary gear set and the first element of the second planetary gear set is produced by closing the fourth shift element. A rotationally fixed connection between the third element of the first planetary gear set and the third element of the second planetary gear set is produced by closing the fifth shift element.

According to example aspects of the invention, a rotor of an electric machine or motor is permanently connected to the third element of the first planetary gear set in a rotationally fixed fashion. Since the first element of the first planetary gear set is permanently rotationally fixedly immobilized and the second element of the first planetary gear set is permanently connected to the input shaft, there is a fixed transmission ratio between the input shaft and the third element of the first planetary gear set regardless of gear ratio. Here, in any gear ratio, the rotor of the electric machine rotates at a higher rotational speed than the input shaft. Thus, the electric machine can be configured for higher rotational speeds and lower torque, whereby the electric machine is smaller and less expensive to produce. Furthermore, the first planetary gear set is involved in the formation of the gear ratios. Thus, no additional planetary gear set is required for forming the upstream transmission ratio for the electric machine. The third element of the first planetary gear set additionally has a rotational speed in any gear ratio, which is also shown in further course. The transmission therefore makes it possible for power both to be output and to be received by the electric machine in any gear ratio.

At least eight forward gear ratios between the input shaft and the output shaft can be selected in automated fashion through selective actuation of the first to fifth shift elements. The first forward gear ratio is realized by closing the first shift element and the second shift element. The second forward gear ratio is realized by closing the first shift element and the fourth shift element. The third forward gear ratio is realized by closing the first shift element and the third shift element. The fourth forward gear ratio is realized by closing the third shift element and the fourth shift element. The fifth forward gear ratio is realized by closing the second shift element and the third shift element. The sixth forward gear ratio is realized by closing the third shift element and the fifth shift element. The seventh forward gear ratio is realized by closing the second shift element and the fifth shift element. The eighth forward gear ratio is realized by closing the fourth shift element and the fifth shift element. Through this assignment of the first to fifth shift elements to the individual forward gear ratios, a transmission ratio series well-suited for use in the motor vehicle is achieved with suitable selection of the fixed carrier transmission ratio of the planetary gear sets. Furthermore, two adjacent gear ratios always have a shift element which is closed in both of said gear ratios. Therefore, during a shift process into an adjacent gear ratio, it is merely necessary for one shift element to be opened and one shift element to be closed. This simplifies the shift process and shortens the shift duration.

The first shift element is preferably embodied as a positively-locking shift element. Positively-locking shift elements produce the connection in the closed state by positive locking, and are characterized by lower drag losses in the open state than frictionally-locking shift elements. For example, the first shift element may be designed as a dog-clutch shift element, which may also be formed without a synchronizing device. Owing to the low drag losses in the open state, the efficiency of the transmission is further improved, in particular because the first shift element is closed only in the first to third forward gear ratios of the motor vehicle. The first shift element is therefore predominantly open during the operation of the transmission in the motor vehicle. Since the first shift element is closed only in the first to third forward gear ratios, the shift element is always opened, but not closed, during shift processes into a higher gear ratio. An opening of a dog-clutch shift element is considerably more straightforward than the closing process, because the claws of the dog-clutch shift element must firstly engage into the gaps provided for them in the case of closing, whereas the claws merely have to be set to a load-free state in the case of opening. Both processes require time, wherein, in particular in the case of shift processes from a low gear ratio into a higher gear ratio, the shift time should be as short as possible for the sake of driving dynamics. Since the first shift element must however never be closed but only open during shift processes into a higher gear ratio, the design of the first shift element as a positively-locking shift element does not give rise to any limitation with regard to the shift duration.

According to one refinement, the transmission has a sixth and a seventh shift element. A rotationally fixed connection between the second element of the second planetary gear set and the third element of the third planetary gear set is produced by closing the sixth shift element. The second element of the third planetary gear set is rotationally fixedly immobilizable by closing the seventh shift element, in that the second element of the third planetary gear set is connected rotationally fixedly to the housing of the transmission or to some other rotationally fixed component of the transmission. Via this specific embodiment of the transmission, it is possible to form at least one mechanical reverse gear ratio while at the same time embodying the transmission as what is referred to as a "front-mounted longitudinal transmission" for a motor vehicle, that is to say a transmission with coaxial drive and output at axially opposite ends of the transmission. The automatic transmission presented in FIG. 7 of the prior art DE 102 13 820 A1 likewise has a brake which is designated as B-2 and has the purpose of rotationally fixed immobilization of the carrier designated as C3 of the third planetary gear set which is designated as G3. However, this automatic transmission is embodied as what is referred to as a "front-mounted transverse transmission", that is to say featuring axis-parallel drive and output. This automatic transmission has a making gear which is designated as 19' for this purpose which meshes via an outer toothing arrangement with an axis-parallel differential shaft (not illustrated). An embodiment as a front-mounted longitudinal transmission is not really possible here, since as a result of the connection of the carrier C3 to the brake B-2 the output shaft cannot be made to extend to an axial end of the automatic transmission. This problem is solved in the patent application relating to the subject matter by the sixth shift element which is configured to interrupt the connection between the second element of the second planetary gear set and the third element of the third planetary gear set in a shiftable fashion. This is because this connection is not necessary for the formation of a mechanical reverse gear ratio. However, the connection is necessary for the formation of the forward gear ratios. Therefore, the sixth shift element is closed in all the forward gear ratios, while the seventh shift element is opened in all the forward gear ratios. The third planetary gear set is embodied here as a minus gear set. As a result, an embodiment of the transmission as a "front-mounted longitudinal transmission" for a motor vehicle is also made possible. This is illustrated in particular by FIG. 4.

The sixth and seventh shift elements are preferably embodied as positively-locking shift elements, in particular as dog-clutch shift elements, which improves the mechanical efficiency of the transmission.

According to a possible refinement, the sixth and seventh shift elements have a common shift element half. In other words, the sixth and seventh shift elements are constructed as a double-acting shift element, wherein by actuating the common shift element half both the sixth and the seventh shift elements can be actuated. As a result, only one actuator is required for actuating the sixth and seventh shift elements, which simplifies the mechanical design of the transmission.

A first mechanical reverse gear ratio is realized by closing the first shift element, the seventh shift element and the second shift element. Alternatively or additionally to this, a second mechanical reverse gear ratio is realized by closing the first shift element, the seventh shift element and the fourth shift element. The sixth shift element is opened in both mechanical reverse gear ratios. In this context, in particular the first reverse gear ratio is advantageous, since in the first forward gear ratio the second shift element is also closed. This simplifies a shift process between a first reverse gear ratio and a first forward gear ratio. The first and the second reverse gear ratio can be provided as emergency reverse gear ratios, since in the case of an operation counter to a preferred direction of rotation and insertion of one of the forward gear ratios, it is also possible to form reverse gear ratios with the electric machine.

According to one refinement, the transmission has, at one axial end, a connecting shaft which can be connected by an eighth shift element to the input shaft. The sixth shift element can uncouple a drive unit, connected to the connecting shaft, from the drive shaft of the transmission, for example if the motor vehicle is driven purely by the electric machine of the transmission. The connecting shaft and output shaft are arranged coaxially with respect to one another and at opposite ends of the transmission. The transmission is therefore embodied as a "front-mounted longitudinal transmission" for a motor vehicle. The planetary gear sets are arranged in the following axial sequence proceeding from the axial end of the transmission to which the connecting shaft is assigned: first planetary gear set, second planetary gear set, third planetary gear set. This permits a compact design of the transmission.

According to an alternative refinement, the transmission likewise has the eighth shift element by which the input shaft is connectable to the connecting shaft, wherein, proceeding from that axial end of the transmission which is assigned to the connecting shaft, the planetary gear sets are arranged in the following axial sequence: third planetary gear set, second planetary gear set, first planetary gear set. This refinement is particularly suitable for a "front-mounted transverse transmission" for a motor vehicle, wherein the drive shaft has a toothing arrangement which meshes with a toothing arrangement of a shaft which is axis-parallel with respect to the input shaft. The power of the output shaft is transmitted to the wheels of the motor vehicle via this axis-parallel shaft.

According to an embodiment, the eighth shift element is embodied as a positively-locking shift element. As a result, the efficiency of the motor vehicle transmission can be improved, since the eighth shift element generates significantly lower drag losses in the opened state than a frictionally-locking shift element such as, for example, a multi-plate clutch.

According to one alternative embodiment, the eighth shift element is embodied as a frictionally-locking shift element with variable torque-transmitting capability, for example as a dry or wet multi-plate clutch. A multi-plate clutch is composed of an inner plate support and an outer plate support, wherein a multiplicity of inner plates is connected to the inner plate support, and a multiplicity of outer plates is connected to the outer plate support. The inner plates and outer plates are arranged alternately and overlap one another. If a force is applied to the plates perpendicularly with respect to the plate surface of the plates, a torque is transmitted from one plate support to the other plate support by friction between the inner plates and outer plates. The torque which is transmitted from one plate support to the other plate support depends here on the force applied. If the force is large enough to prevent a differential rotational speed between the inner plates and outer plates through frictional locking, the entire torque is transmitted. If the force is not sufficient for this, only part of the torque is transmitted, wherein a differential rotational speed occurs between the inner plates and outer plates. This state is also referred to as slipping operation. The torque-transmitting capability of the eighth shift element can be adjusted by varying the force applied to the plates.

A section of the input shaft is preferably arranged radially within the second and third planetary gear sets, wherein the third shift element is arranged axially in the region of that axial end of the transmission which is assigned to the output shaft. As result it is possible to reduce the axial overall length of the transmission.

The second shift element is preferably arranged at least radially in sections or partially within the fourth shift element. As a result, the axial overall length of the transmission can be reduced.

The transmission can be a component of a hybrid drivetrain of a motor vehicle. The hybrid drivetrain also has, in addition to the transmission, an internal combustion engine which is connected to the connecting shaft of the transmission. The drive shaft of the transmission is connected to a drive which is connected to wheels of the motor vehicle. The hybrid drivetrain makes a plurality of drive modes of the motor vehicle possible. In an electric driving mode, the motor vehicle is driven by the electric machine of the transmission, wherein the eighth shift element is opened. In an internal combustion engine mode, the motor vehicle is driven by the internal combustion engine, wherein the eighth shift element is closed. In a hybrid mode, the motor vehicle is driven both by the internal combustion engine and by the electric machine of the transmission.

The transmission permits a multiplicity of possibilities for making available a starting function of the motor vehicle. In the internal combustion engine mode, the sixth element can serve as a starting element. In the event of a malfunction or of overloading of the sixth shift element, the second element can also be used as a starting element. In the electric driving mode, the electric machine can make available the starting function proceeding from its zero rotational speed with an engaged forward gear ratio.

An electric machine or motor is composed at least of a rotationally fixed stator and a rotatably mounted rotor and, in a motor mode, the electric machine is configured to convert electrical energy into mechanical energy in the form of rotational speed and torque, and to convert mechanical energy into electrical energy in the form of current and voltage in a generator operation.

The term permanent connection refers to a connection between two elements which exist constantly. Elements which are continuously connected in this way rotate constantly with the same dependence between their rotational speeds. A shift element cannot be located in a permanent connection between two elements. A permanent connection can therefore be differentiated from a shiftable connection.

BRIEF DESCRIPTION OF THE DRAWINGS

Exemplary embodiments of the invention are described in detail below with reference to the attached figures.

DETAILED DESCRIPTION

Figure 1:
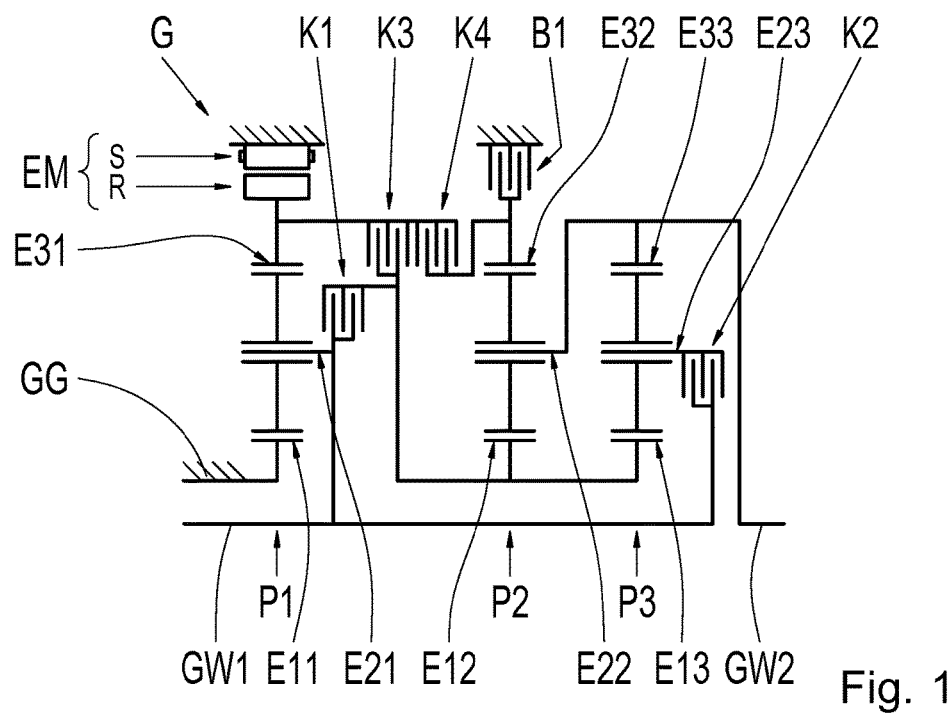
FIG. 1 shows a schematic view of a transmission corresponding to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a transmission G for a motor vehicle corresponding to a first exemplary embodiment of the invention. The transmission G has an input shaft GW1, an output shaft GW2, a first planetary gear set P1, a second planetary gear set P2, a third planetary gear set P3 and an electric machine EM which includes a stator S and a rotor R. First, second and third planetary gear sets P1, P2, P3 are formed as minus or negative gear sets and each have a first element E11, E12, E13, a second element E21, E22, E23 and a third element E31, E32, E33. The first element E11, E12, E13 is assigned to a sun gear of the respective planetary gear set P1, P2, P3. The second element E21, E22, E23 is assigned to a carrier of the respective planetary gear set P1, P2, P3. The third element E31, E32, E33 is assigned to a ring gear of the respective planetary gear set P1, P2, P3.

The first element E11 of the first planetary gear set P1 is fixedly permanently rotationally immobilized by being connected to a housing GG or to another rotationally fixed component. The second element E21 of the first planetary gear set P1 is permanently connected to the input shaft GW1. The first element E12 of the second planetary gear set P2 is permanently connected to the first element E13 of the third planetary gear set P3. The second element E22 of the second planetary gear set P2 is permanently connected to the third element E33 of the third planetary gear set P3. The third element E33 of the third planetary gear set P3 is permanently connected to the output shaft GW2. The third element E31 of the first planetary gear set P1 is permanently connected to the rotor R of the electric machine EM.

The transmission G also has at least five shift elements. The third element E32 of the second planetary gear set P2 is rotationally fixedly immobilizable by closing the first shift element B1. The input shaft GW1 is connectable to the first element E12 of the second planetary gear set P2 by closing the second shift element K1. The input shaft GW1 is connectable to the second element E22 of the third planetary gear set P3 by closing the third shift element K2. The third element E31 of the first planetary gear set P1 is connectable to the first element E12 of the second planetary gear set P2 by closing the fourth shift element K3. The third element E31 of the first planetary gear set P1 is connectable to the third element E32 of the second planetary gear set P2 by closing the fifth shift element K4. The shift elements B1, K1, K2, K3, K4 are illustrated in the form of plate shift elements. However, this is not to be considered as limiting. A selection of the shift elements B1, K1, K2, K3, K4 can also be formed as dog-clutch shift elements, in particular the first shift element B1. This applies to all the exemplary embodiments.

The exemplary embodiment of the transmission G which is illustrated in FIG. 1 is formed as what is referred to as a "front-mounted longitudinal transmission" for a motor vehicle. The input shaft GW1 and output shaft GW2 are correspondingly arranged coaxially with respect to one another and at opposite axial ends of the transmission G. The third shift element K2 is arranged here axially in the region of that axial end of the transmission G which is assigned to the output shaft GW2. The connection of input shaft GW1 to the third shift element K2 runs radially within the second and third planetary gear sets P2, P3 here. The second shift element K1 is arranged radially in sections within the fourth shift element K3. Proceeding from that axial end of the transmission G which is assigned to the input shaft GW1, the planetary gear sets P1, P2, P3 are arranged in the following axial sequence: first planetary gear set P1, second planetary gear set P2, third planetary gear set P3.

Figure 2:
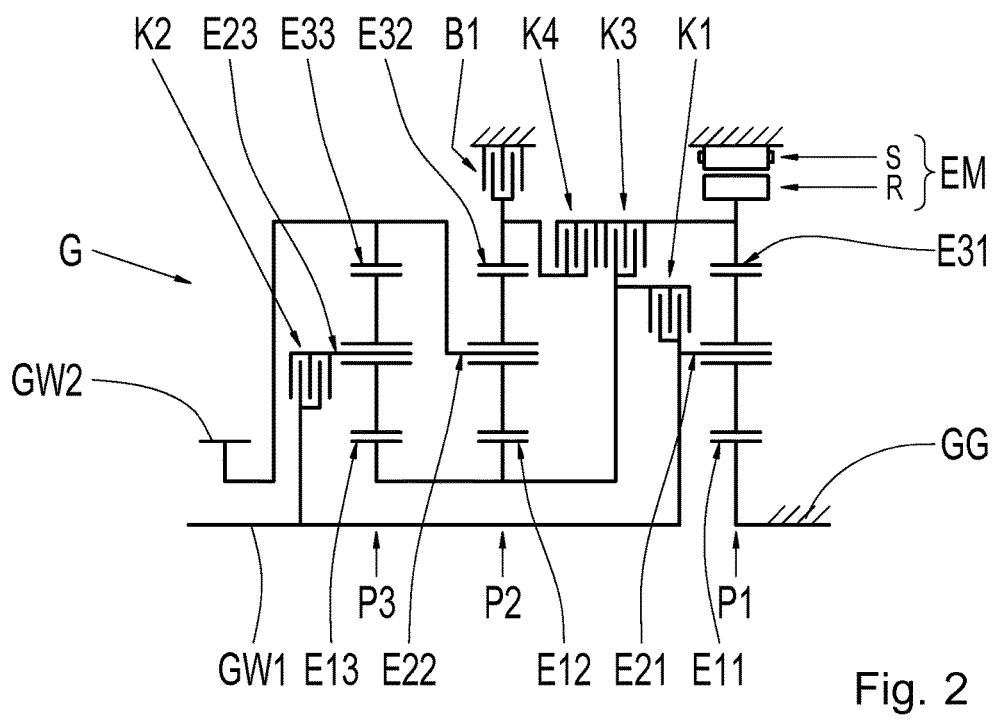
FIG. 2 shows a schematic view of a transmission corresponding to a second exemplary embodiment of the invention.

FIG. 2 shows a schematic view of a transmission G corresponding to a second exemplary embodiment of the invention. In contrast to the first exemplary embodiment illustrated in FIG. 1, the transmission G is now formed as what is referred to as a "front-mounted transverse transmission" for a motor vehicle. The output shaft GW2 is correspondingly arranged at the same axial end as the input shaft GW1. The output shaft GW2 has an outer toothing arrangement which is configured to mesh with an outer toothing of a shaft (not illustrated) which is arranged axis-parallel with respect to the output shaft GW2. Proceeding from the axial end of the transmission G, to which both the input shaft GW1 and the output shaft GW2 are assigned, the planetary gear sets P1, P2, P3 are arranged in the following axial sequence: third planetary gear set P3, second planetary gear set P2, first planetary gear set P1. The connection of input shaft GW1 to the third shift element K2 runs radially within the second and third planetary gear sets P2, P3 here. The second shift element K1 is arranged radially in sections within the fourth shift element K3.

Figures 3, 4:
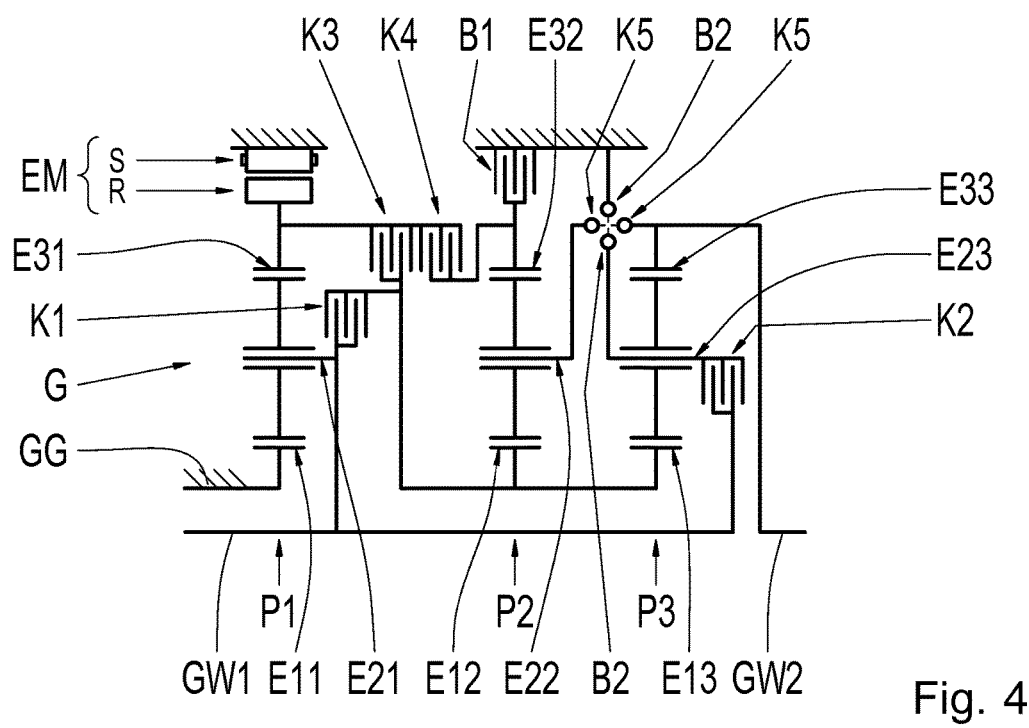
FIG. 3 shows a shift pattern of the transmission of the first and second exemplary embodiments.
FIG. 4 shows a schematic view of a transmission corresponding to a third exemplary embodiment of the invention.

FIG. 3 shows a shift pattern for transmission G according to the first and second exemplary embodiments. Eight forward gears G1 through G8 are specified in the lines of the shift pattern. In the columns of the shift pattern, an "x" represents which of the shift elements B1, K1, K2, K3, K4 are closed in which forward gear ratio G1 to G8.

FIG. 4 shows a schematic view of a transmission G corresponding to a third exemplary embodiment of the invention, which corresponds essentially to the first exemplary embodiment. However, the transmission G according to the third exemplary embodiment has a sixth shift element K5 and a seventh shift element B2. A rotationally fixed connection between the second element E22 of the second planetary gear set P2 and the third element E33 of the third planetary gear set P3 is produced by closing the sixth shift element K5. A rotationally fixed connection between the second element E22 of the third planetary gear set P3 and the housing GG or another rotationally conjoint component of the transmission G is produced by closing the seventh shift element B2. The sixth and seventh shift elements K5, B2 are embodied here as positively-locking dog-clutch shift elements and arranged in the direct spatial vicinity of one another. The sixth and seventh shift elements K5, B2 are constructed here in such a way that only one of the two shift elements K5, B2 can be closed. In a neutral position it is also possible for both shift elements K5, B2 to be opened.

Figure 5:
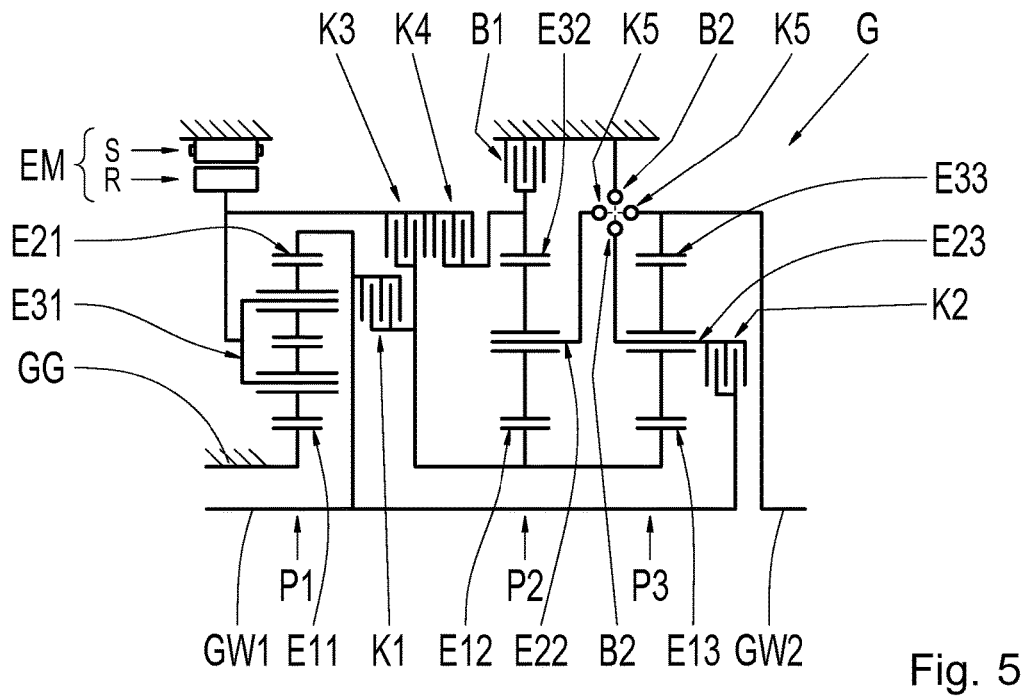
FIG. 5 shows a schematic view of a transmission corresponding to a fourth exemplary embodiment of the invention.

FIG. 5 shows a schematic view of a transmission G corresponding to a fourth exemplary embodiment of the invention. In contrast to the third exemplary embodiment, the first planetary gear set P1 in the fourth exemplary embodiment is embodied as a plus or positive gear set. This change can also be applied in the first or second exemplary embodiment.

Figure 6:
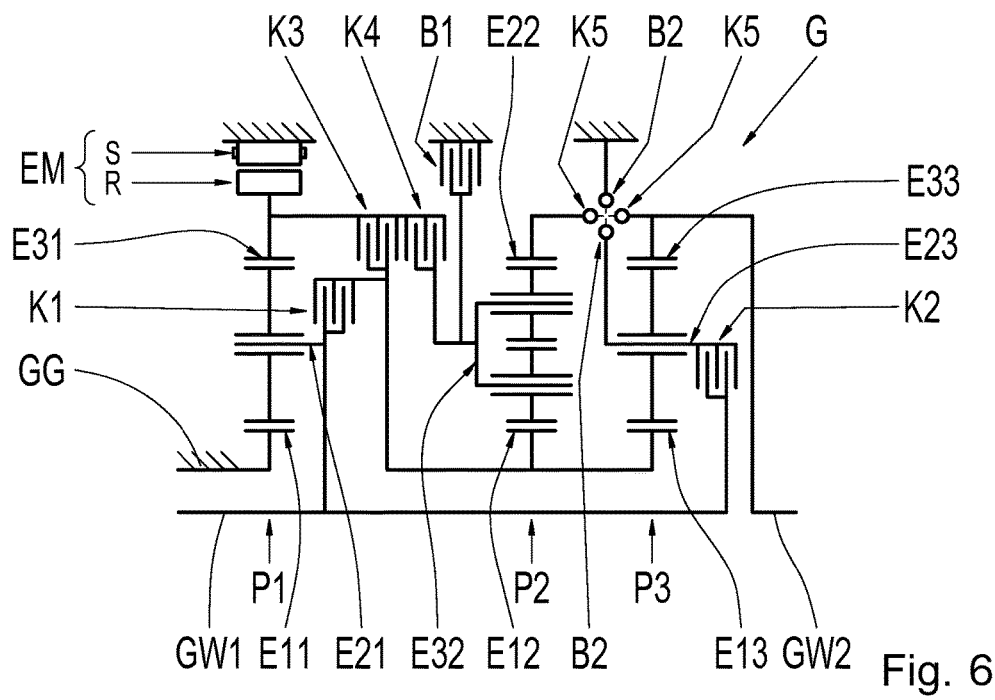
FIG. 6 shows a schematic view of a transmission corresponding to a fifth exemplary embodiment of the invention.

FIG. 6 shows a schematic view of a transmission G corresponding to a fifth exemplary embodiment of the invention. In contrast to the third exemplary moment, the second planetary gear set P2 in the fourth exemplary embodiment is embodied as a plus or positive gear set. This change can also be applied in the first or second exemplary embodiment.

In all the exemplary embodiments, the first and the second planetary gear sets P1, P2 can also be embodied as plus gear sets. In the first example, each of the planetary gear sets P1, P2, P3 can be embodied as a plus gear set. However, for the sake of clarity these variants are not illustrated.

Figures 7, 8:
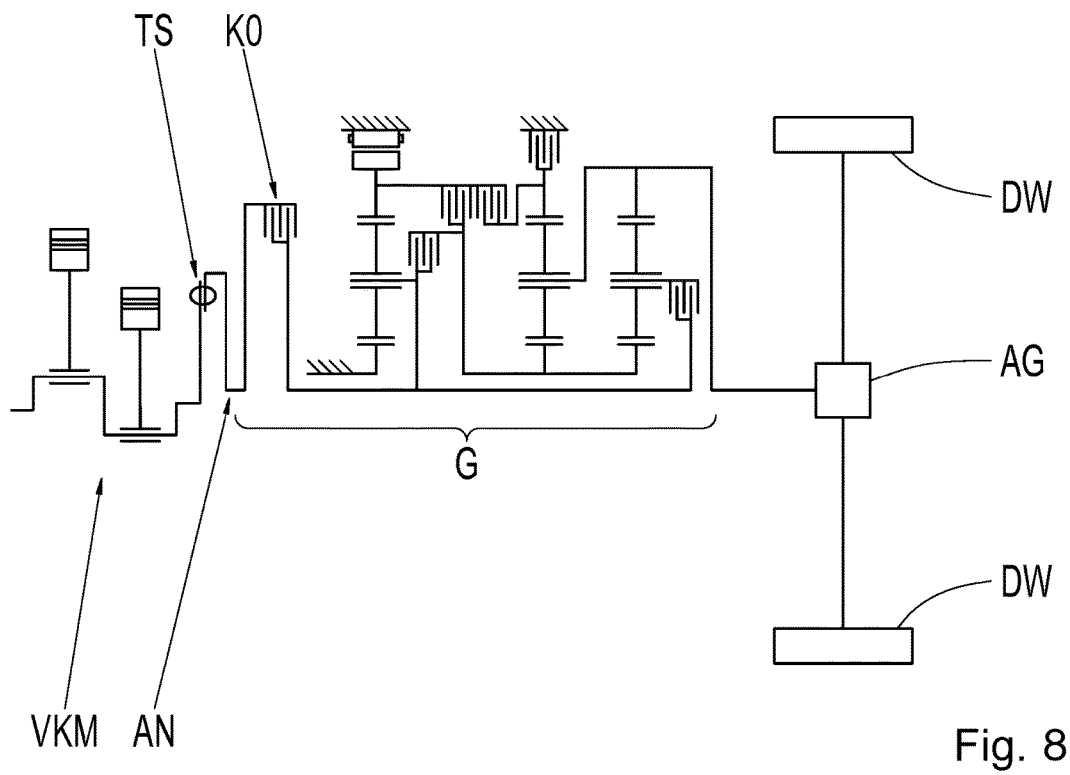
FIG. 7 shows a shift pattern of the transmission of the third to fifth exemplary embodiments.
FIG. 8 shows a hybrid drivetrain of a motor vehicle.

FIG. 7 shows a shift pattern of the transmission of the third to fifth exemplary embodiments. Eight forward gear ratios G1 to G8 and a first and second reverse gear ratio R1, R2 are specified in the lines of the shift pattern. In the columns of the shift pattern, an "x" represents which of the shift elements B1, K1, K2, K3, K4, K5, B2 are closed in which forward gear ratio G1 to G8 or reverse gear ratio R1, R2.

In all these exemplary embodiments, the input shaft GW1 can be connectable to a connecting shaft AN via an eighth shift element K0. The eighth shift element K0 can be embodied here either as a frictionally-locking shift element with a variable torque transmission capability or as a positively-locking shift element.

FIG. 8 shows a hybrid drivetrain of a motor vehicle having a transmission G according to the first exemplary embodiment. This is to be considered as being merely exemplary. The hybrid drivetrain could be constructed with any of the specified exemplary embodiments of the transmission G. The hybrid drivetrain has an internal combustion engine VKM which is connected to the connecting shaft AN of the transmission G via a torsion vibration damper TS. The connecting shaft AN is connectable to the input shaft GW1 of the transmission G via the eighth shift element K0. The output shaft GW2 has an operative drive connection to an axle transmission AG. Proceeding from the axle transmission AG, the power which is present at the output shaft GW2 is distributed to wheels DW of the motor vehicle. In the motor mode of the electric machine EM, electrical power is fed to the stator S via a power inverter (not illustrated). In the generator mode of the electric machine EM, the stator S feeds electrical power to the power inverter. The power inverter here converts the DC voltage of an energy accumulator (not illustrated) into an AC voltage which is suitable for the electric machine EM, and vice versa.

Modifications and variations can be made to the embodiments illustrated or described herein without departing from the scope and spirit of the invention as set forth in the appended claims.

REFERENCE DESIGNATIONS

G Transmission
GW1 Input shaft
GW2 Output shaft
AN Connecting shaft
GG Housing
P1 First planetary gear set
P2 Second planetary gear set
P3 Third planetary gear set
EM Electric machine
R Rotor
S Stator
E11 First element of the first planetary gear set
E21 Second element of the first planetary gear set
E31 Third element of the first planetary gear set
E12 First element of the second planetary gear set
E22 Second element of the second planetary gear set
E32 Third element of the second planetary gear set
E13 First element of the third planetary gear set
E23 Second element of the third planetary gear set
E33 Third element of the third planetary gear set
B1 First shift element
K1 Second shift element
K2 Third shift element
K3 Fourth shift element
K4 Fifth shift element
K5 Sixth shift element
B2 Seventh shift element
K0 Eighth shift element
G1-G8 First to eighth forward gear ratio
R1 First reverse gear ratio
R2 Second reverse gear ratio
VKM Internal combustion engine
DW Wheels
AG Axle transmission
TS Torsional vibration damper

The invention claimed is:

1. A transmission (G) for a motor vehicle, comprising:
an input shaft (GW1);
an output shaft (GW2);
a plurality of planetary gear sets including a first, a second and a third planetary gear set (P1, P2, P3);
a plurality of shift elements including a first, second, third, fourth and fifth shift element (B1, K1, K2, K3, K4), the plurality of shift elements configured such that engagement of the plurality of shift elements realizes at least eight selectable forward gear ratios (G1-G8) between the input shaft (GW1) and the output shaft (GW2),
wherein each of the first, second and third planetary gear sets (P1, P2, P3) is either a negative gear set or a positive gear set,
wherein each of the first, second and third planetary gear sets (P1, P2, P3) has
a first element (E11, E12, E13) that is a sun gear of the respective first, second or third planetary gear set (P1, P2, P3),
a second element (E21, E22, E23) that is a carrier of the respective planetary gear set (P1, P2, P3) in the case of the negative gear set or that is a ring gear of the respective first, second or third planetary gear set (P1, P2, P3) in the case of the positive gear set, and
a third element (E31, E32, E33) that is the ring gear of the respective planetary gear set (P1, P2, P3) in the case of the negative gear set or that is the carrier of the respective first, second or third planetary gear set (P1, P2, P3) in the case of the positive gear set,
wherein the first element (E11) of the first planetary gear set (P1) is permanently rotationally fixedly immobilized, wherein the second element (E21) of the first planetary gear set (P1) is permanently connected to the input shaft (GW1), wherein the first element (E12) of the second planetary gear set (P2) is permanently connected to the first element (E13) of the third planetary gear set (P3), wherein the second element (E22) of the second planetary gear set (P2) is connected to the third element (E33) of the third planetary gear set (P3) in all of the at least eight selectable forward gear ratios (G1-G8), wherein the third element (E33) of the third planetary gear set (P3) is permanently connected to the output shaft (GW2), wherein the third element (E32) of the second planetary gear set (P2) is rotationally fixedly immobilizable by closing the first shift element (B1), wherein the input shaft (GW1) is connectable to the first element (E12) of the second planetary gear set (P2) by closing the second shift element (K1), wherein the input shaft (GW1) is connectable to the second element (E23) of the third planetary gear set (P3) by closing the third shift element (K2), wherein the third element (E31) of the first planetary gear set (P1) is connectable to the first element (E12) of the second planetary gear set (P2) by closing the fourth shift element (K3), wherein the third element (E31) of the first planetary gear set (P1) is connectable to the third element (E32) of the second planetary gear set (P2) by closing the fifth shift element (K4), and wherein the third element (E31) of the first planetary gear set (P1) is permanently connected to a rotor (R) of an electric motor (EMI) in a rotationally fixed fashion.

2. The transmission (G) of claim 1, wherein a first forward gear ratio (G1) of the at least eight selectable forward gear ratios (G1-G8) is realized by closing the first shift element (B1) and the second shift element (K1), a second forward gear ratio (G2) of the at least eight selectable forward gear ratios (G1-G8) is realized by closing the first shift element (B1) and the fourth shift element (K3), a third forward gear ratio (G3) of the at least eight selectable forward gear ratios (G1-G8) is realized by closing the first shift element (B1) and the third shift element (K2), a fourth forward gear ratio (G4) of the at least eight selectable forward gear ratios (G1-G8) is realized by closing the third shift element (K2) and the fourth shift element (K3), a fifth forward gear ratio (G5) of the at least eight selectable forward gear ratios (G1-G8) is realized by closing the second shift element (K1) and the third shift element (K2), a sixth forward gear ratio (G6) of the at least eight selectable forward gear ratios (G1-G8) is realized by closing the third shift element (K2) and the fifth shift element (K4), a seventh forward gear ratio (G7) of the at least eight selectable forward gear ratios (G1-G8) is realized by closing the second shift element (K1) and the fifth shift element (K4), and an eighth forward gear ratio (G8) of the at least eight selectable forward gear ratios (G1-G8) is realized by closing the fourth shift element (K3) and the fifth shift element (K4).

3. The transmission (G) of claim 1, wherein the first shift element (B1) is a dog-clutch shift element.

4. The transmission (G) of claim 1, wherein:
the plurality of shift elements further comprises a sixth and a seventh shift element (K5, B2),
the second element (E22) of the second planetary gear set (P2) is connectable to the third element (E33) of the third planetary gear set (P3) by closing the sixth shift element (K5),
the second element (E23) of the third planetary gear set (P3) is rotationally fixedly immobilizable by closing the seventh shift element (B2),
the sixth shift element (K5) is closed in all the forward gear ratios (G1-G8), and the seventh shift element (B2) is opened in all the forward gear ratios (G1-G8), and
the third planetary gear set (P3) is the negative gear set.

5. The transmission (G) of claim 4, wherein the sixth and seventh shift elements (K5, B2) are positively-locking shift elements.

6. The transmission (G) of claim 5, wherein the sixth and seventh shift elements (K5, B2) have a common shift element half.

7. The transmission (G) of claim 4, wherein a first reverse gear ratio (R1) is realized by closing the first shift element (B1), the second shift element (K1) and the seventh shift element (B2).

8. The transmission (G) of claim 4, wherein a second reverse gear ratio (R2) is realized by closing the first shift element (B1), the fourth shift element (K3) and the seventh shift element (B2).

9. The transmission (G) of claim 1, further comprising a connecting shaft (AN) connectable by an eighth shift element (K0) of the plurality of shifting elements to the input shaft (GW1), the connecting shaft (AN) and the output shaft (GW2) arranged coaxially with respect to one another, the connecting shaft (AN) and the output shaft (GW2) positioned at opposite axial ends of the transmission (G),
wherein, proceeding from that axial end of the transmission (G) which is proximate the connecting shaft (AN), the planetary gear sets (P1, P2, P3) are arranged in the following axial sequence: the first planetary gear set (P1); the second planetary gear set (P2); and the third planetary gear set (P3).

10. The transmission (G) of claim 9, wherein the eighth shift element (K0) is a positively-locking shift element.

11. The transmission (G) of claim 9, wherein the eighth shift element (K0) is a frictionally-locking shift element with variable torque-transmitting capability.

12. The transmission (G) of claim 1, further comprising a connecting shaft (AN) connectable by an eighth shift element (K0) of the plurality of shifting elements to the input shaft (GW1),
wherein, proceeding from an axial end of the transmission (G) which is proximate the connecting shaft (AN), the planetary gear sets (P1, P2, P3) are arranged in the following axial sequence: third planetary gear set (P3); second planetary gear set (P2); first planetary gear set (P1).

13. The transmission (G) of claim 12, wherein the eighth shift element (K0) is a positively-locking shift element.

14. The transmission (G) of claim 12, wherein the eighth shift element (K0) is a frictionally-locking shift element with variable torque-transmitting capability.

15. The transmission (G) of claim 1, wherein:
a section of the input shaft (GW1) is arranged radially within the second and third planetary gear sets (P2, P3), and the third shift element (K2) is arranged axially proximate an axial end of the transmission (G) at which the output shaft (GW2) is positioned.

16. The transmission (G) of claim 1, wherein the second shift element (K1) is arranged, at least in part, radially within the fourth shift element (K3).

17. A hybrid drivetrain for a motor vehicle comprising the transmission (G) of claim 1.

* * * * *